(12) United States Patent
Upadhyay et al.

(10) Patent No.: US 9,010,087 B1
(45) Date of Patent: Apr. 21, 2015

(54) METHOD AND SYSTEM FOR $NO_x$ SENSOR DEGRADATION

(71) Applicant: Ford Global Technologies, LLC, Dearborn, MI (US)

(72) Inventors: Devesh Upadhyay, Canton, MI (US); In Kwang Yoo, Ann Arbor, MI (US); Michiel J. Van Nieuwstadt, Ann Arbor, MI (US); David John Kubinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 14/079,475

(22) Filed: Nov. 13, 2013

(51) Int. Cl.
*F01N 11/00* (2006.01)
*F01N 3/18* (2006.01)
*F01N 3/20* (2006.01)

(52) U.S. Cl.
CPC .......... *F01N 3/18* (2013.01); *F01N 2900/0416* (2013.01); *F01N 3/208* (2013.01); *F01N 3/206* (2013.01); *F01N 2560/026* (2013.01); *F01N 2560/021* (2013.01); *F01N 2610/146* (2013.01); *F01N 2550/05* (2013.01); *F01N 11/00* (2013.01)

(58) Field of Classification Search
CPC ................. F01N 11/00; F01N 2550/05; F01N 2560/021; F01N 2560/026; F01N 2610/146; F01N 2900/0416; F01N 3/206; F01N 3/208

USPC .................... 60/274, 276, 277, 286, 295, 301
See application file for complete search history.

(56) References Cited

U.S. PATENT DOCUMENTS

| | | | |
|---|---|---|---|
| 6,209,315 B1 | 4/2001 | Weigl | |
| 8,096,125 B2 | 1/2012 | Hepburn et al. | |
| 8,240,136 B2 | 8/2012 | Kurtz et al. | |
| 8,332,130 B2 | 12/2012 | Stretch | |
| 8,347,609 B2 | 1/2013 | Hepburn et al. | |
| 8,347,611 B2 | 1/2013 | Hepburn et al. | |
| 8,505,371 B2 | 8/2013 | Zimmerman et al. | |
| 8,516,799 B2 | 8/2013 | Hepburn et al. | |
| 8,516,800 B2 | 8/2013 | Liu et al. | |
| 2009/0139212 A1* | 6/2009 | Miwa | 60/277 |
| 2011/0061370 A1 | 3/2011 | Aoyama et al. | |
| 2011/0083429 A1 | 4/2011 | Sato et al. | |

(Continued)

OTHER PUBLICATIONS

Riffle, Chris et al., "Methods and Systems for Ammonia Slip Detection," U.S. Appl. No. 13/650,967, filed Oct. 12, 2012, 31 pages.

(Continued)

*Primary Examiner* — Thomas Denion
*Assistant Examiner* — Jorge Leon, Jr.
(74) *Attorney, Agent, or Firm* — Julia Voutyras; Alleman Hall McCoy Russell & Tuttle LLP

(57) ABSTRACT

Various systems and method for detecting exhaust $NO_x$ sensor degradation are disclosed. In one example, degradation of the $NO_x$ sensor is indicated responsive to reductant injection in an exhaust passage under engine off conditions. For example, degradation of the $NO_x$ sensor is indicated when an actual $NO_x$ sensor output differs from an expected $NO_x$ sensor output by more than a threshold amount.

20 Claims, 7 Drawing Sheets

(56) References Cited

U.S. PATENT DOCUMENTS

| | | |
|---|---|---|
| 2011/0167805 A1 | 7/2011 | Chen |
| 2011/0247316 A1 | 10/2011 | Dubkov et al. |
| 2012/0090296 A1 | 4/2012 | Yacoub |
| 2012/0204847 A1 | 8/2012 | Valencia |
| 2013/0213012 A1 | 8/2013 | Van Nieuwstadt et al. |
| 2013/0219867 A1 | 8/2013 | Gady et al. |
| 2014/0144126 A1* | 5/2014 | Kowalkowski et al. ........ 60/274 |

OTHER PUBLICATIONS

Upadhyay, Devesh et al., "Method and System for Reductant Injector Degradation," U.S. Appl. No. 14/079,440, filed Nov. 13, 2013, 43 pages.

Herman, A. et al., "Model Based Control of SCR Dosing and OBD Strategies with Feedback from NH3 Sensors," SAE 2009 International Series 2009-01-0911, 11 pages.

* cited by examiner

METHOD AND SYSTEM FOR NO$_x$ SENSOR DEGRADATION

TECHNICAL FIELD

The present application relates to methods for diagnosing a NOx sensor coupled to an exhaust gas treatment system of an internal combustion engine.

BACKGROUND AND SUMMARY

Vehicle systems may include an engine with an exhaust gas treatment system coupled in an exhaust passage in order to control regulated emissions. In some examples, the exhaust gas treatment system may include a selective catalytic reduction (SCR) system in which a reductant, such as urea or ammonia, is added to the exhaust stream upstream of a reduction catalyst such that NO$_x$ may be reduced by the catalyst. The SCR system may also include one or more NO$_x$ sensors such as a feedgas NO$_x$ sensor coupled upstream of the SCR catalyst and a tailpipe NO$_x$ sensor coupled downstream of the SCR catalyst. Based on the output of the upstream and downstream NO$_x$ sensors, a performance of the SCR catalyst may be determined. In addition, dosing control of the reductant may be adapted based on the output of the NO$_x$ sensors. Therefore, to enable accurate dosing control as well as to enable monitoring of the SCR system efficiency, the sensors may need to be periodically diagnosed.

Thus, methods and systems for diagnosing of a feedgas exhaust NO$_x$ sensor coupled in an exhaust passage upstream of an exhaust SCR catalyst is provided. One example method comprises indicating degradation of a feedgas exhaust NO$_x$ sensor based on an exhaust reductant level estimated by the sensor following engine shutdown to rest. In this way, NO$_x$ sensor health can be correlated with the lingering presence of ammonia deposits after a vehicle engine has been turned off.

For example, an engine system may be configured with an SCR catalyst in the exhaust passage and a urea injector positioned upstream of the SCR catalyst. A feedgas NO$_x$ sensor may be coupled to the exhaust passage upstream of the SCR catalyst and downstream of the urea injector. After an engine shutdown to rest, a controller may operate a reductant injector to inject a defined amount of reductant into the exhaust passage. The controller may then monitor the response of the feedgas NO$_x$ sensor. If the output of the NO$_x$ sensor does not match an output expected based on the active injection of reductant, NO$_x$ sensor degradation may be determined. Based on the deviation of the estimated output from the expected output, dynamic characteristics of the feedgas NO$_x$ sensor may be learned and updated so that reductant dosing control can be adjusted during a subsequent engine restart.

In this way, the health and performance characteristics of a feedgas exhaust NO$_x$ sensor can be better identified. By monitoring the output of an exhaust NO$_x$ sensor during engine shutdown conditions, while reductant is injected upstream of the sensor, correlations between the injection and the exhaust NO$_x$ sensor output can be used to learn NO$_x$ sensor behavior. Specifically, natural sublimation of ammonia injected in an exhaust passage after an engine shutdown can be used to diagnose an exhaust NO$_x$ sensor. By improving NO$_x$ sensor diagnostics, emissions compliance is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
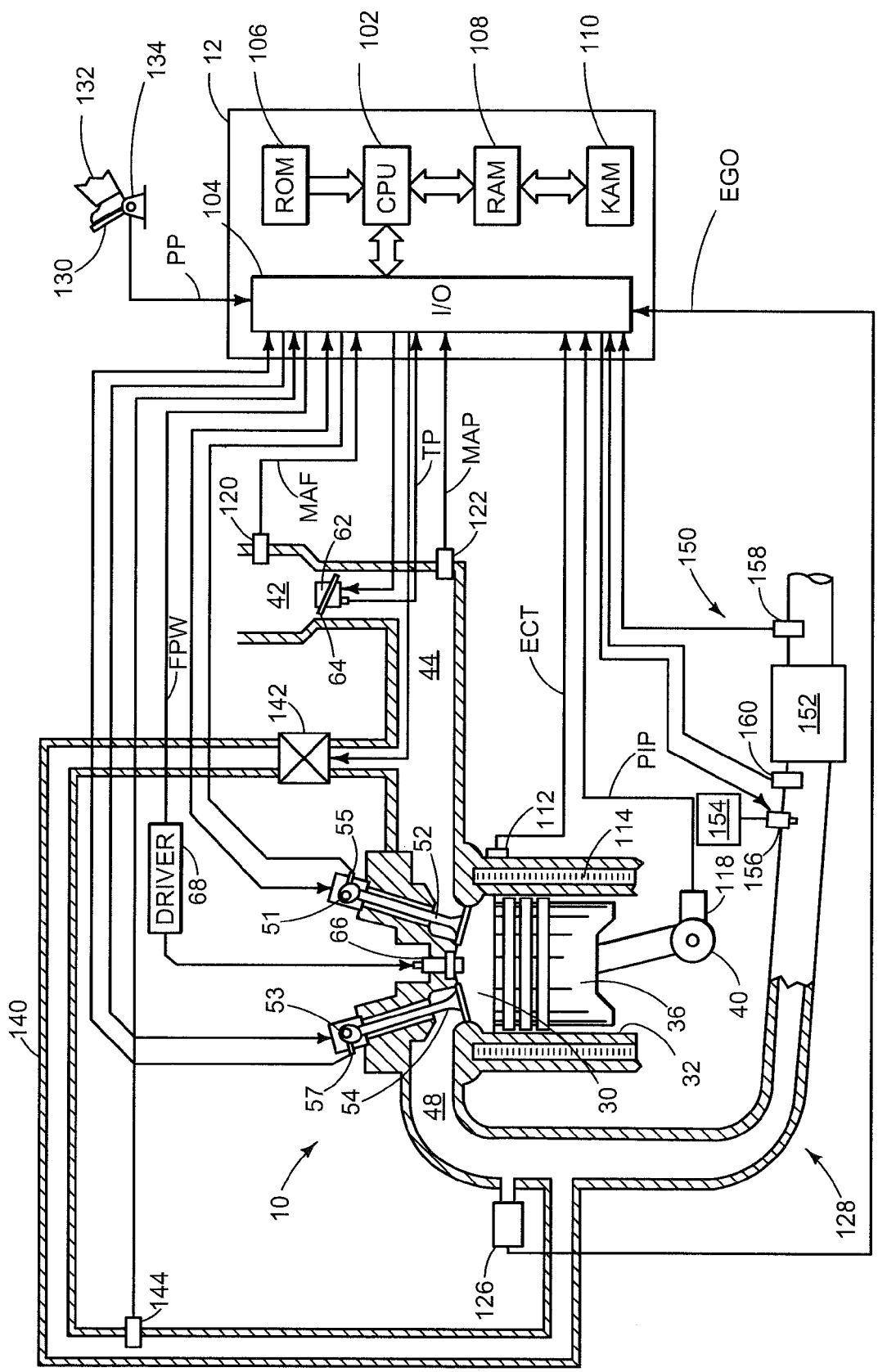
FIG. 1 shows a schematic diagram of an engine including an exhaust system with an exhaust gas treatment system.
Figure 2:
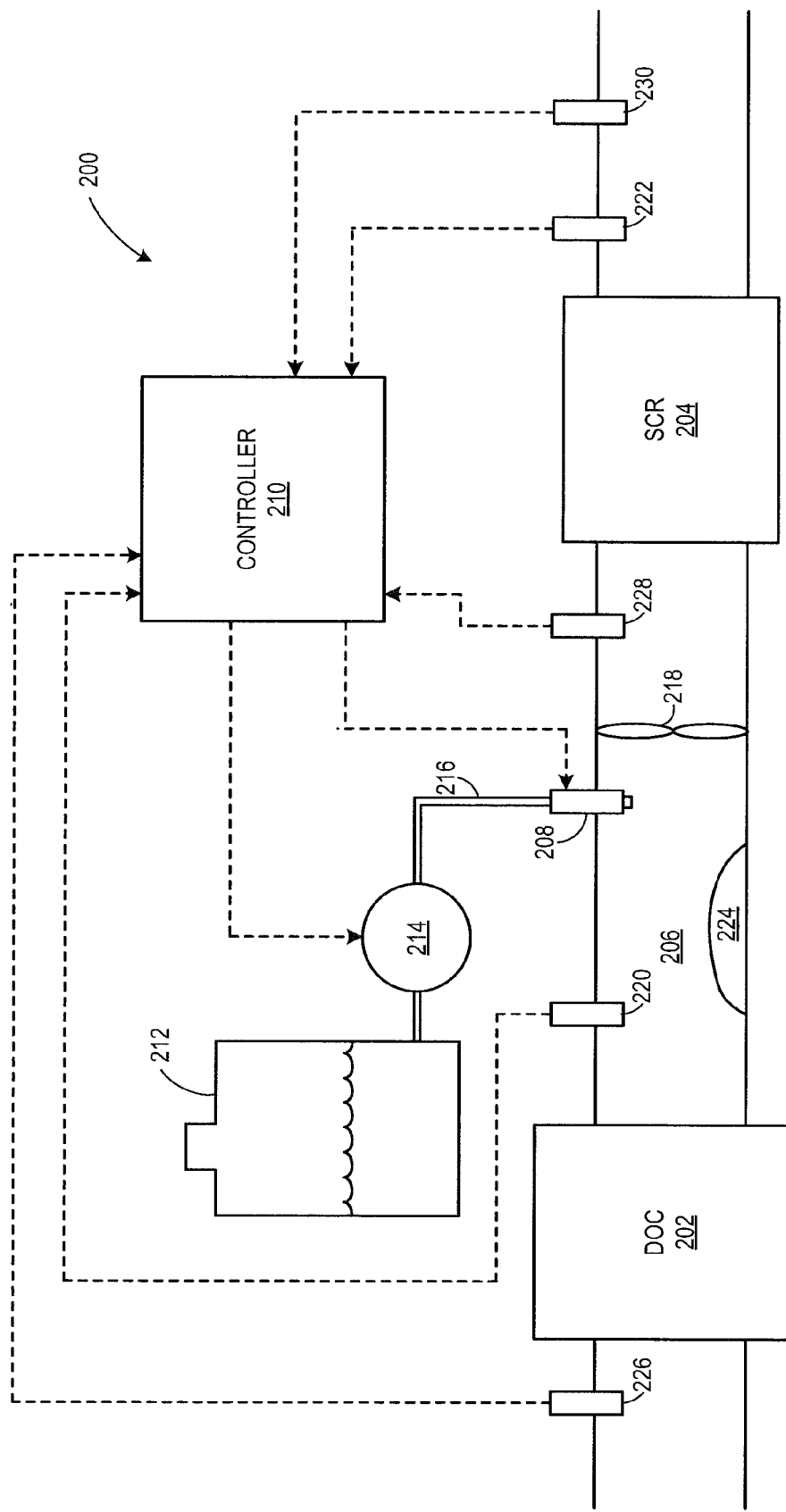
FIG. 2 shows urea deposit formation in an exhaust passage.
Figure 6:
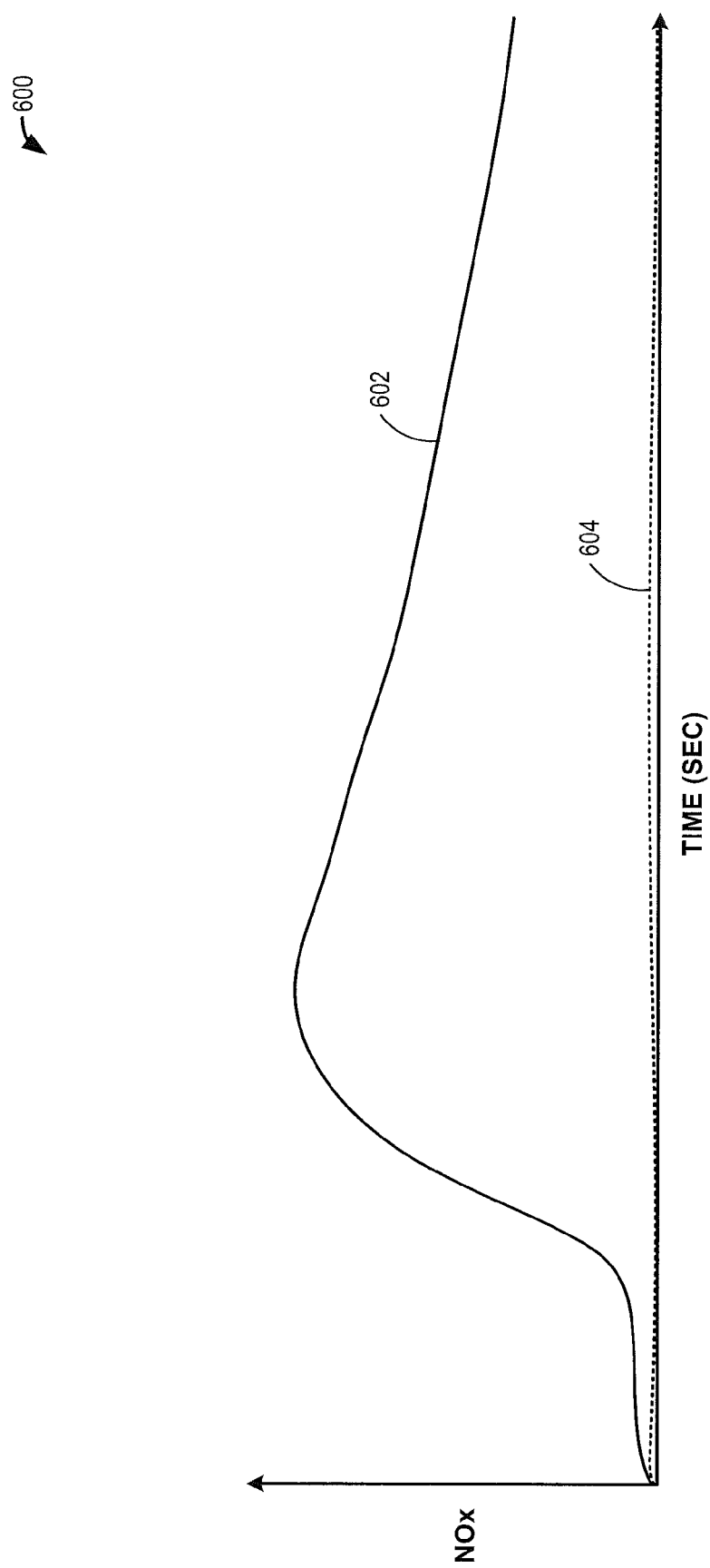
FIG. 6 shows a graph illustrating an example of urea injector degradation detection or an example of NO$_x$ sensor degradation detection.
Figure 7:
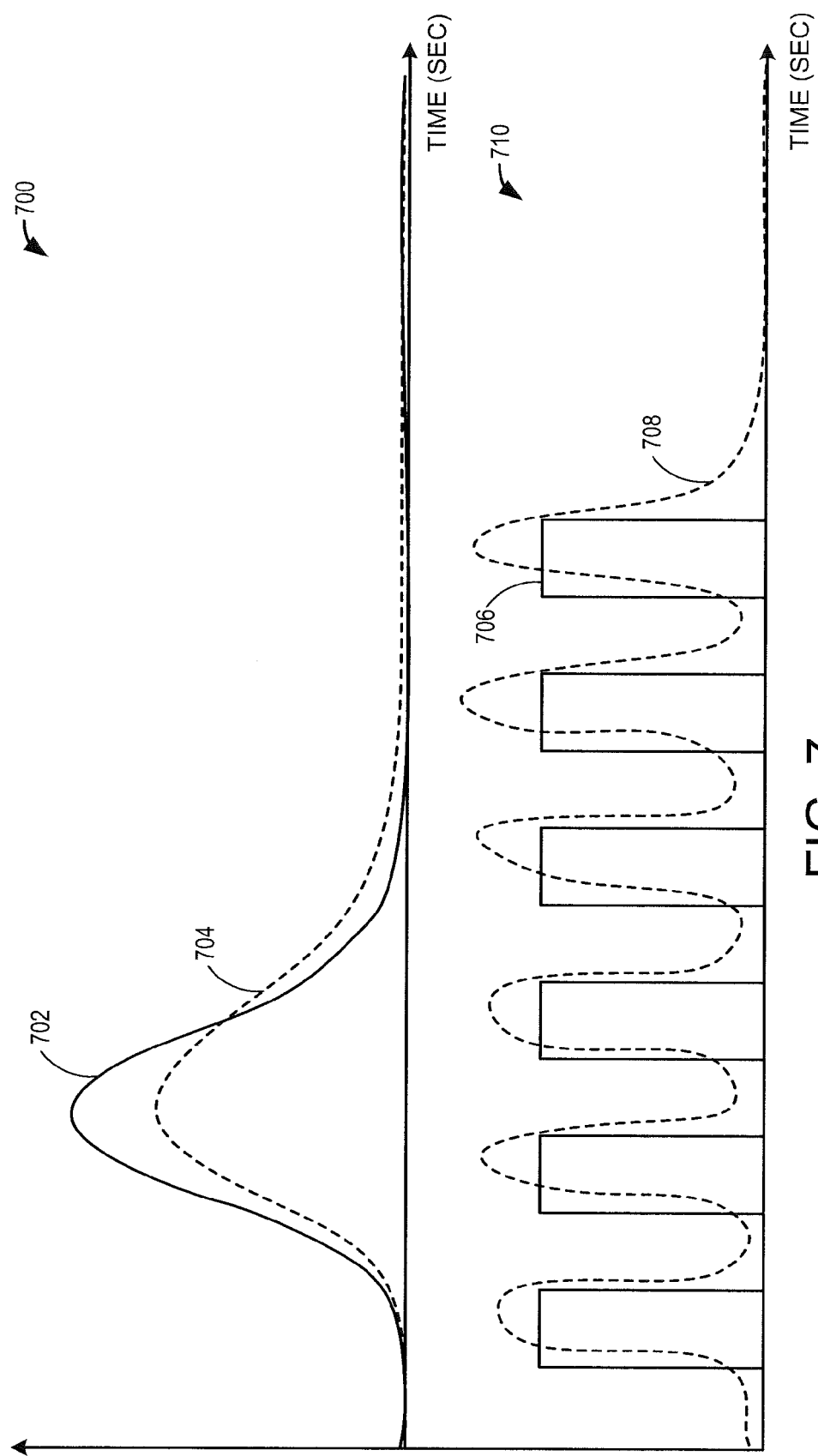
FIG. 7 shows a graph illustrating an example of feedgas exhaust NOx sensor degradation detection.

The following description relates to methods and systems for using an exhaust NO$_x$ sensor output generated after an engine shutdown to rest to diagnose exhaust after-treatment system components, such as those included in the engine system of FIG. 1. For example, the method allows for detection of urea deposits in the engine exhaust passage, as shown at FIG. 2. A controller may be configured to perform a control routine, such as the routine of FIG. 3, to identify reductant injector degradation based on the output profile of an exhaust NO$_x$ sensor, estimated after the engine has spun to rest, in relation to an expected output profile based on engine conditions. The controller may then adjust reductant dosing control during a subsequent engine start based on an indication of injector leakage, as shown at FIG. 4. The controller may also be configured to perform a control routine, such as the routine of FIG. 5, to inject a known amount of reductant into the exhaust passage after the engine has spun to rest and identify NO$_x$ sensor degradation based on estimated output profile of the exhaust NO$_x$ sensor in relation to an expected output profile based on the injected reductant. Example diagnostic operations are shown at FIGS. 6-7. In this way, exhaust emissions are improved.

Referring now to FIG. 1, a schematic diagram showing one cylinder of a multi-cylinder engine 10, which may be included in a propulsion system of an automobile, is illustrated. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (i.e., cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In the example depicted in FIG. 1, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and the exhaust valve 54 may be determined by position sensors 55 and 57, respectively. In alternative embodiments, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

In some embodiments, each cylinder of the engine 10 may be configured with one or more fuel injectors for providing fuel thereto. As a non-limiting example, the cylinder 30 is shown including one fuel injector 66. The fuel injector 66 is shown coupled directly to the cylinder 30 for injecting fuel directly therein in proportion to the pulse width of signal FPW received from the controller 12 via an electronic driver 68. In this manner, the fuel injector 66 provides what is known as direct injection (hereafter also referred to as "DI") of fuel into the combustion cylinder 30.

It will be appreciated that in an alternate embodiment, the injector 66 may be a port injector providing fuel into the intake port upstream of the cylinder 30. It will also be appreciated that the cylinder 30 may receive fuel from a plurality of injectors, such as a plurality of port injectors, a plurality of direct injectors, or a combination thereof.

In one example, the engine 10 is a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition.

The intake passage 42 may include a throttle 62 having a throttle plate 64. In this particular example, the position of the throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by throttle position signal TP. The intake passage 42 may include a mass air flow sensor 120 and a manifold air pressure sensor 122 for providing respective signals, MAF and MAP, to the controller 12.

Further, in the disclosed embodiments, an exhaust gas recirculation (EGR) system may route a desired portion of exhaust gas from the exhaust passage 48 to the intake passage 42 via an EGR passage 140. The amount of EGR provided to the intake manifold 44 may be varied by a controller 12 via an EGR valve 142. By introducing exhaust gas to the engine 10, the amount of available oxygen for combustion is decreased, thereby reducing combustion flame temperatures and reducing the formation of $NO_x$ for example. As depicted, the EGR system further includes an EGR sensor 144 which may be arranged within the EGR passage 140 and may provide an indication of one or more of pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

An exhaust system 128 includes an exhaust gas sensor 126 coupled to the exhaust passage 48 upstream of an exhaust gas treatment system 150. The sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust gas treatment system 150 is shown arranged along the exhaust passage 48 downstream of the exhaust gas sensor 126.

In the example shown in FIG. 1, the exhaust gas treatment system 150 is a urea based selective catalytic reduction (SCR) system. The SCR system includes at least a reduction catalyst (herein, SCR catalyst 152), a reductant storage tank (herein, urea storage reservoir 154), and a reductant injector (herein, urea injector 156), for example. In other embodiments, the exhaust gas treatment system 150 may additionally or alternatively include other components, such as a particulate filter, lean $NO_x$ trap, three way catalyst, various other emission control devices, or combinations thereof. For example, urea injector 156 may be positioned upstream of reduction catalyst 152 and downstream of an oxidation catalyst. In the depicted example, the urea injector 156 provides urea from the urea storage reservoir 154. However, various alternative approaches may be used, such as solid urea pellets that generate an ammonia vapor, which is then injected or metered to the SCR catalyst 152. In still another example, a lean $NO_x$ trap may be positioned upstream of the SCR catalyst 152 to generate $NH_3$ for the SCR catalyst 152, depending on the degree or richness of the air-fuel ratio fed to the lean $NO_x$ trap.

The exhaust gas treatment system 150 further includes a tailpipe exhaust gas sensor 158 positioned downstream of the SCR catalyst 152. In the depicted embodiment, tailpipe exhaust gas sensor 158 may be a $NO_x$ sensor, for example, for measuring an amount of post-SCR $NO_x$ released via the tailpipe of exhaust passage 48. Exhaust gas treatment system 150 may further include a feedgas exhaust gas sensor 160 positioned upstream of the SCR catalyst 152 and downstream of urea injector 156. In the depicted embodiment, the feedgas exhaust gas sensor 160 may also be a $NO_x$ sensor, for example, for measuring an amount of pre-SCR $NO_x$ received in the exhaust passage for treatment at the SCR catalyst.

In some examples, an efficiency of the SCR system may be determined based on the output of one or more of tailpipe exhaust gas sensor 158 and feedgas exhaust gas sensor 160. For example, the SCR system efficiency may be determined by comparing $NO_x$ levels upstream of the SCR catalyst (via sensor 160) with $NO_x$ levels downstream of the SCR catalyst (via sensor 158). The efficiency may be further based on the exhaust gas sensor 126 (when the sensor 126 measures $NO_x$, for example) positioned upstream of the SCR system. In other examples, exhaust gas sensors 158, 160, and 126 may be any suitable sensor for determining an exhaust gas constituent concentration, such as a UEGO, EGO, HEGO, HC, CO sensor, etc.

The controller 12 is shown in FIG. 1 as a microcomputer, including a microprocessor unit 102, input/output ports 104, an electronic storage medium for executable programs and calibration values shown as a read only memory chip 106 in this particular example, random access memory 108, keep alive memory 110, and a data bus. The controller 12 may be in communication with and, therefore, receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to the crankshaft 40; throttle position (TP) from a throttle position sensor; absolute manifold pressure signal, MAP, from the sensor 122; and exhaust constituent concentration from the exhaust gas sensors 126, 160, and 158. An engine speed signal, RPM, may be generated by the controller 12 from signal PIP.

The storage medium read-only memory 106 can be programmed with non-transitory, computer readable data representing instructions executable by the processor 102 for performing the methods described below as well as other variants that are anticipated but not specifically listed. Example methods are described herein with reference to FIGS. 3-5.

As described above, FIG. 1 shows only one cylinder of a multi-cylinder engine, and each cylinder may similarly include its own set of intake/exhaust valves, fuel injector, spark plug, etc.

FIG. 2 shows a detailed embodiment of an exhaust gas after-treatment system 200, such as the exhaust gas treatment system 150 described above with reference to FIG. 1. As shown, the exhaust gas treatment system 200 includes a first catalyst 202, such as a diesel oxidation catalyst, and a second catalyst 204, such as an SCR catalyst, arranged along an exhaust passage 206. In the example of FIG. 2, the second (reduction) catalyst 204 is positioned downstream of the first (oxidation) catalyst 202. The exhaust reductant injector 208 injects a reductant, such as urea or ammonia, into the exhaust stream for reaction with $NO_x$ in the second catalyst 204 responsive to signals received from a controller 210.

In the example depicted in FIG. 2, the exhaust reductant injector 208 is supplied with reductant from a reductant storage reservoir 212. The reductant storage reservoir 212 may be a reservoir suitable for holding the reductant throughout a range of temperatures, for example. The reductant is pumped from the reductant storage reservoir 212 via a pump 214. The pump 214 pumps reductant from the reductant storage reservoir 212 and delivers the reductant to the exhaust passage 206 at a higher pressure. As shown, a reductant passage 216 fluidically couples the pump 214 and the reductant injector 208. In some embodiments, reductant that enters the exhaust passage 206 may be mixed into the exhaust stream via a mixer 218.

The exhaust gas treatment system 200 further includes a feedgas $NO_x$ sensor 220 disposed downstream of the first catalyst 202, downstream of the reductant injector 208, and upstream of the second catalyst 204. Thus, feedgas exhaust NOx sensor may provide an estimate of NOx levels in exhaust gas entering the SCR catalyst. The exhaust gas treatment system 200 further includes a tailpipe $NO_x$ sensor 222 disposed downstream of the second catalyst 204. Thus, tailpipe exhaust NOx sensor may provide an estimate of NOx levels in exhaust gas leaving the SCR catalyst. The feedgas $NO_x$ sensor 220 and tailpipe $NO_x$ sensor 222 may be used to determine an amount of $NO_x$ in the exhaust passage 206, for example, such that reductant dosing may be controlled, at least in part, based on the amount of $NO_x$ in the exhaust passage 206. As described in greater detail below with reference to FIG. 5, feedgas $NO_x$ sensor 220 degradation may be determined under engine off conditions based on an amount of reductant injected to the exhaust passage 206 after the engine has been shut down to rest. For example, actual output of the feedgas $NO_x$ sensor 220 may be compared to an expected output of the feedgas $NO_x$ sensor 220, the expected output based on an amount of reductant injected by the exhaust reductant injector 208 into the exhaust passage 206 following an engine shutdown to rest. If there is a discrepancy between the expected valve and the actual output, NOx sensor degradation may be determined.

Further, as described in detail with reference to FIG. 3, the feedgas $NO_x$ sensor may be utilized to determine reductant injector 208 degradation. For example, over time the reductant injector 208 may begin to leak, such that a greater than desired amount of reductant enters the exhaust passage 206. As a result, a reductant deposit 224 may form in the exhaust passage 206, for example. Depending on an ambient temperature and an exhaust temperature, which may be measured by temperature sensors 226, 228, and 230, for example, the reductant deposit 224 may sublimate such that reductant vapor may be sensed by the feedgas $NO_x$ sensor 220 when $NO_x$ is not present in the exhaust passage 206 (e.g., during engine off conditions). Thus, during conditions when the engine is shutdown, the feedgas NOx sensor may be used to estimate reductant levels (e.g., ammonia levels) in the exhaust passage, downstream of the reductant injector and upstream of the SCR catalyst, and infer if reductant deposits have formed. The feedgas NOx sensor output may also be used to estimate a size of the reductant deposit. Based on the size of the deposits (e.g., if they are larger than a threshold size, or larger than an expected size), injector leakage may be identified. As described in greater detail below with reference to FIG. 3, the feedgas $NO_x$ sensor 220 may provide an indication of reductant injector 208 degradation. For example, actual output of the feedgas $NO_x$ sensor 220 is compared to an expected output of the feedgas $NO_x$ sensor 220, the expected output based on an estimated total amount of unreacted reductant stored in the second catalyst 204 and in the exhaust passage 206 during the engine shutdown, an ambient temperature, exhaust flow conditions and exhaust temperature at the engine shutdown.

Thus, the exhaust gas treatment system 200 includes the feedgas $NO_x$ sensor 220 which may be utilized to determine an amount of $NO_x$ present in the exhaust passage 206 during engine-on conditions and an amount of reductant present in the exhaust passage 206 during engine-off conditions. As will be described below, based on output of the feedgas $NO_x$ sensor 220 under the various conditions, feedgas $NO_x$ sensor 220 degradation as well as reductant injector 208 degradation may be determined.

Figure 3:
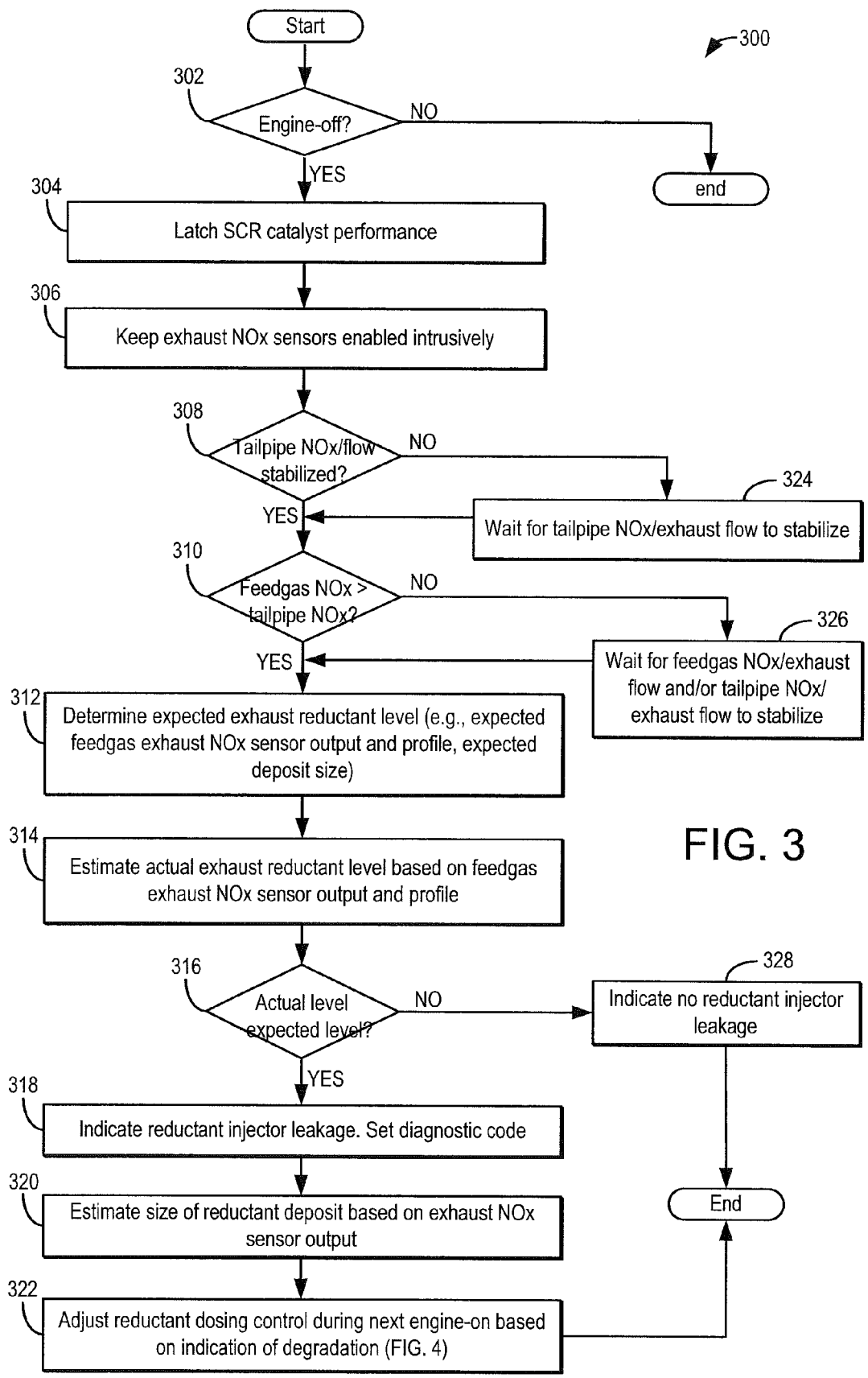
FIG. 3 shows a flow chart illustrating a routine for diagnosing a reductant injection system based on exhaust NO$_x$ levels after an engine shutdown to rest.
Figure 4:
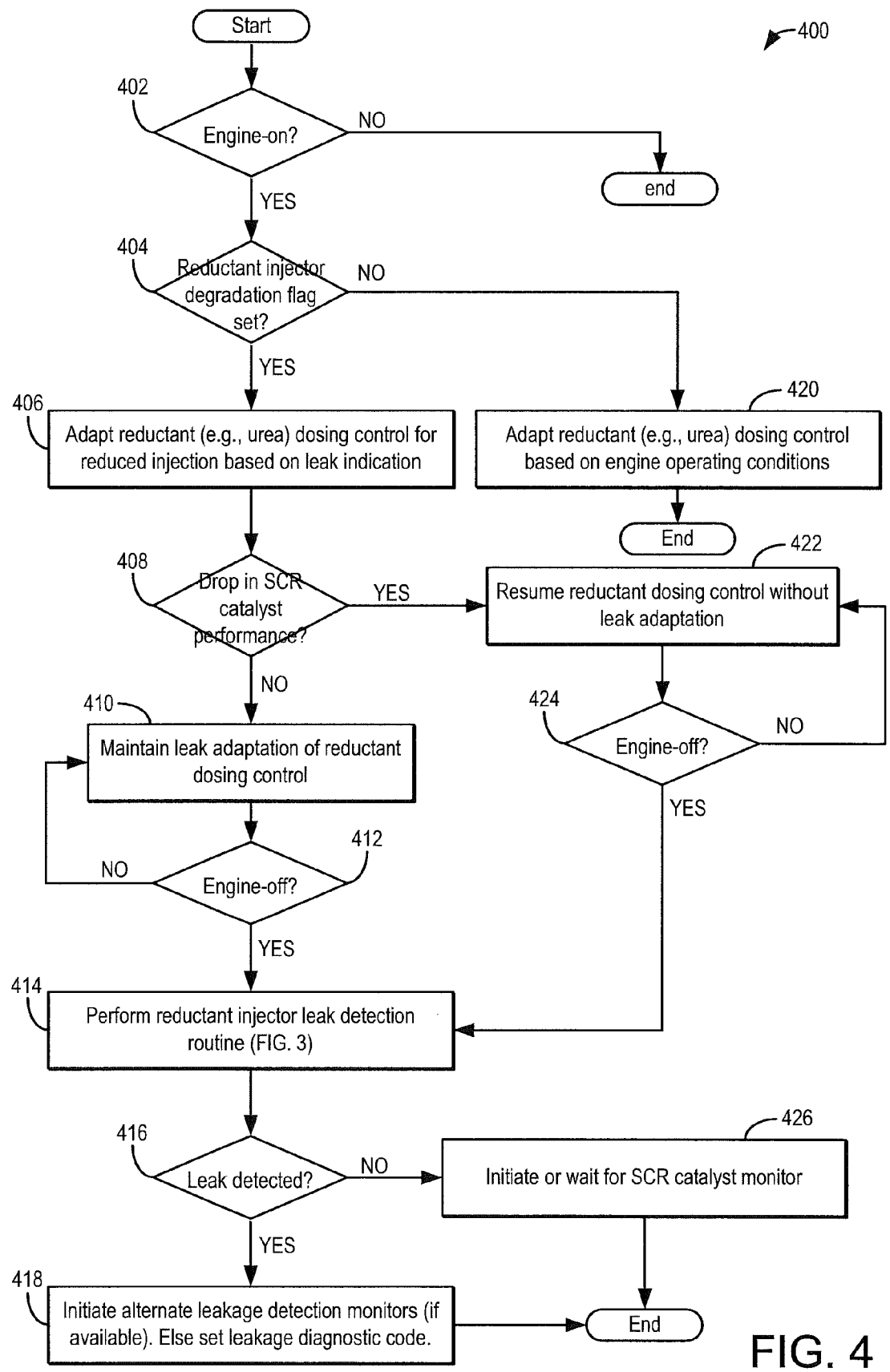
FIG. 4 shows a flow chart illustrating a routine for adjusting reductant dosing control during an engine restart responsive to an indication of injector leakage.
Figure 5:
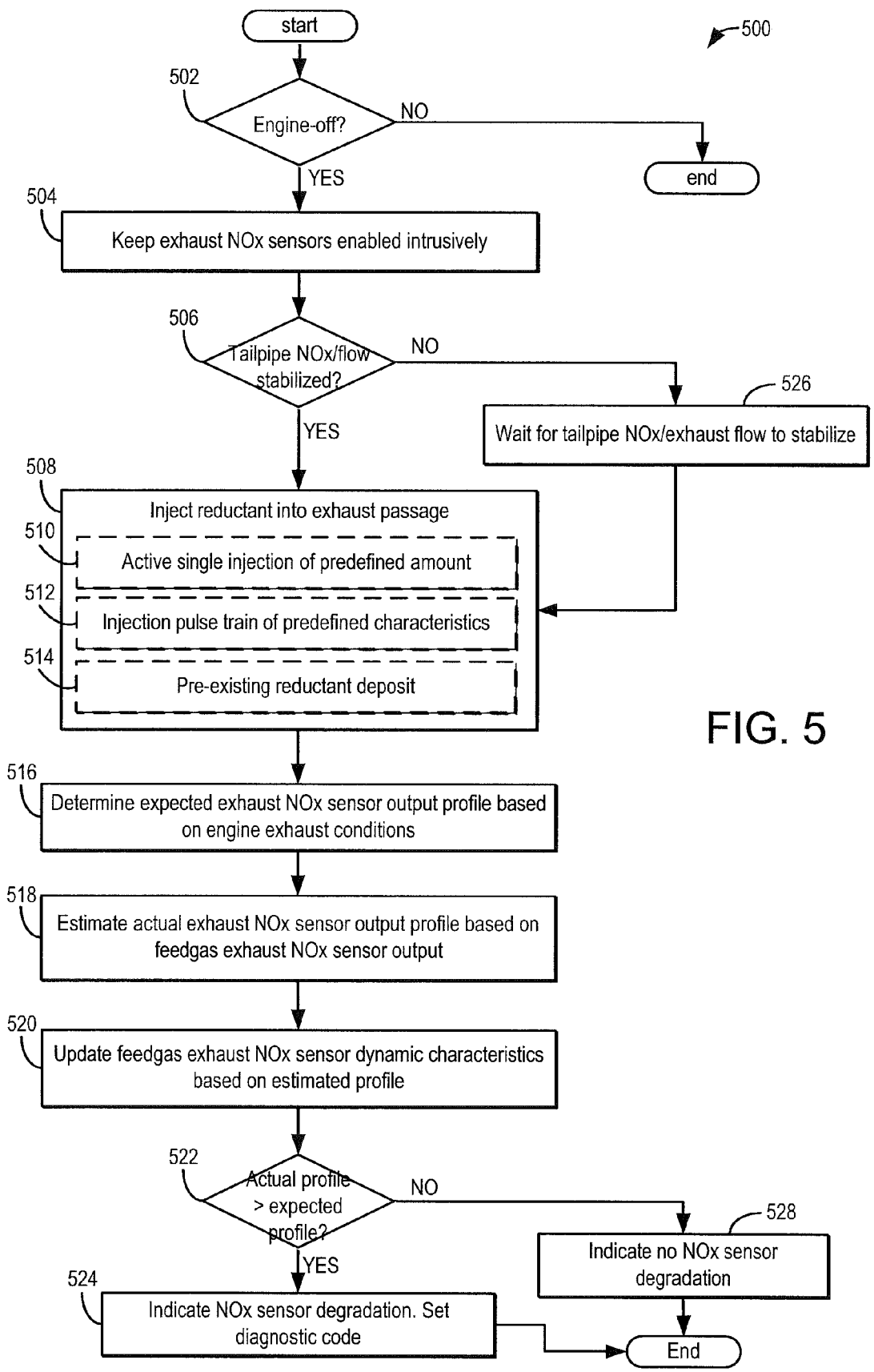
FIG. 5 shows a flow chart illustrating a routine for diagnosing a NO$_x$ sensor based on exhaust NO$_x$ levels after an engine shutdown to rest.

As elaborated with reference to FIGS. 3-5, during conditions when the engine is shutdown to rest and the vehicle is off (e.g., during an engine key-off and/or vehicle key-off event, or engine stop event in a keyless system with a stop/start button), the feedgas exhaust $NO_x$ sensor can be used to estimate reductant levels in the exhaust volume between the injector and the SCR catalyst. The $NO_x$ sensor output can then be used to diagnose the continued presence of reductant deposits as may occur in the presence of injector leakage. For example, urea injector leakage may be diagnosed based on the detection of excess ammonia in the defined space (between the reductant injector and the SCR catalyst). In addition, urea may be actively injected and an output of the feedgas $NO_x$ sensor may be monitored to determine the dynamic characteristics of the NOx sensor. In this way, an output of the feedgas $NO_x$ sensor generated after an engine key-off condition can be advantageously used to identify injector degradation as well as $NO_x$ sensor degradation.

Now turning to FIG. 3, an example routine 300 is shown for diagnosing a reductant injection system based on exhaust $NO_x$ levels after an engine is shutdown to rest. Specifically, the routine determines an expected exhaust reductant level and an actual exhaust reductant level during engine off condition following engine shutdown. Based on a difference between the expected and actual reductant levels, exhaust reductant injector degradation may be indicated. For example, if the actual reductant level is greater than the expected level, exhaust reductant injector degradation such as injector leakage may be indicated.

At 302, it is determined if the engine is off and has spun down to rest, such that the engine is not spinning and combustion is not occurring in any cylinders of the engine. As an example, it may be determined that the engine is off if the ignition key is in the engine-off position or if the stop button has been pressed in a keyless system. As other examples, it may be determined that the engine is off if the vehicle in which the engine is positioned is in a vehicle off condition and/or if an exhaust gas flow level is below a threshold flow. If it is determined that the engine is not off, the routine 300 ends.

On the other hand, if it is determined that the engine is off, the routine continues to 304 where an SCR catalyst performance is latched. For example, the control system may determine a health or status of the SCR catalyst based on output from the exhaust $NO_x$ sensors. The catalyst efficiency value may be used as a reference for the determination of the validity of the corrective control action to be taken on the next key-on cycle (as elaborated at FIG. 4 at step 408).

At 306, exhaust $NO_x$ sensors are kept enabled intrusively. For example, the feedgas $NO_x$ sensor (positioned between the oxidation catalyst and the SCR catalyst) and the tailpipe $NO_x$ sensor (positioned downstream of the SCR catalyst) remain enabled after the engine is shut down such that they continue to output signals indicating $NO_x$ levels in the exhaust passage. As such, the feedgas NOx sensor is maintained enabled even though no further exhaust NOx is expected after the engine is shutdown to rest.

At 308, it is determined if the tailpipe exhaust $NO_x$ level, or tailpipe exhaust flow has stabilized. For example, the system may wait until the signal from the tailpipe $NO_x$ sensor has stabilized or equilibrated before the routine proceeds. Alternatively, the system may wait until the tailpipe exhaust levels have stabilized and the exhaust flow rate is below a threshold flow rate. If it is determined that the tailpipe exhaust $NO_x$ level or exhaust flow is not stabilized, the routine 300 moves to 324 where the system waits for the tailpipe $NO_x$ level or exhaust flow to stabilize.

Once the tailpipe $NO_x$ level/exhaust flow has stabilized or if it is determined that the tailpipe $NO_x$/flow is stable at 308, the routine 300 continues to 310 where it is determined if the amount or level (e.g., concentration) of feedgas $NO_x$ is greater than the amount or level (e.g., concentration) of tailpipe $NO_x$. For example, the amount of feedgas $NO_x$ and the amount of tailpipe $NO_x$ may be determined based on signals from the respective sensors. As such, after engine shutdown, once the tailpipe exhaust flow has stabilized, the output of the feedgas NOx sensor is expected to stabilize and equilibrate with the output of the tailpipe NOx sensor. Also after engine shutdown, when no further exhaust NOx is generated, the feedgas NOx sensor may sense vaporized reductant (e.g., ammonia) remaining in the exhaust passage, in the region between the injector and the SCR catalyst. Therefore, under engine shutdown conditions, once exhaust flow gas stabilized, the feedgas NOx sensor output being higher than the tailpipe NOx sensor output may be indicative of the presence of ammonia deposits in the exhaust passage. If the feedgas NOx amount is less than the amount of tailpipe $NO_x$ amount, the routine moves to 326 and waits for the feedgas NOx sensor signal to stabilize. Once the levels have stabilized, the routine may move forward to 312 to check reductant injector degradation based on the feedgas NOx sensor output. In alternate examples, if after a predetermined duration has elapsed, the feedgas NOx sensor signal continues to not show values that are higher than the tailpipe NOx sensor signal, the controller may indicate that the reductant injection system is in good health (not degraded) and may move directly to step 328 of routine 300.

On the other hand, if it is determined that the amount of feedgas $NO_x$ is greater than the amount of tailpipe $NO_x$, the routine directly proceeds to 312 to diagnose the reductant injector. Specifically, at 312, the expected (e.g., residual) exhaust reductant level is determined. In some examples, the expected reductant level may be an expected ammonia level. For example, based on exhaust flow and temperature conditions, injection conditions, ambient conditions, catalyst conditions, and amount of unreacted reductant stored in the exhaust reduction catalyst, an amount of unreacted exhaust reductant that is expected to remain (or linger) in the exhaust passage between the reductant injector and the SCR catalyst after the engine shutdown is determined. This includes determining an expected size of a reductant deposit in the exhaust passage, a rate of reductant sublimation from the deposit, and a corresponding feedgas NOx sensor output. In one example, the controller may determine an expected feedgas NOx sensor output profile for a duration since the engine shutdown based on the expected size of the ammonia deposit and a rate of natural sublimation of the ammonia deposit (based on the exhaust temperature in the exhaust passage and the ambient temperature at the engine shutdown).

Once the expected exhaust reductant level is determined, the routine 300 continues to 314 where an actual exhaust reductant level is estimated based on feedgas exhaust $NO_x$ sensor output and profile. For example, the actual exhaust reductant level is determined based on a signal output from the feedgas exhaust $NO_x$ sensor. As such, during engine-off conditions when the exhaust gas flow is substantially zero and $NO_x$ is not present in the exhaust passage, the $NO_x$ sensor may act as a reductant (e.g., ammonia) sensor, as the $NO_x$ sensor may be cross-sensitive to gas phase ammonia which sublimates from urea deposits in the exhaust passage. In one example, the actual exhaust reductant level may be estimated via the feedgas $NO_x$ sensor for a duration since the vehicle-off condition to determine an amount of reductant and a rate of reductant sublimation.

At 316 of routine 300, it is determined if the actual exhaust reductant level (determined at 314) is greater than the expected exhaust reductant level (determined at 312). If it is determined that the actual exhaust reductant level is less than the expected exhaust reductant level, the routine moves to 328 where no reductant injector leakage is indicated (e.g., reductant injector leakage is not diagnosed).

On the other hand, if it is determined that the actual exhaust reductant level is greater than the expected exhaust reductant level, the routine continues to 318 where reductant injector degradation is indicated and a diagnostic code is set. Specifically, based on the higher than expected reductant level, the controller infers that a larger than expected reductant deposit is present in the exhaust passage, between the reductant injector and the SCR catalyst, due to reductant injector leakage. As an example, the indication of reductant injector degradation may be an indication of reductant injector leakage.

In one example, the expected exhaust reductant level may be a threshold level, for example. The indication of exhaust reductant injector degradation may be made in response to an output of the feedgas exhaust $NO_x$ sensor being higher than the threshold level. Further still, the indication of exhaust reductant injector degradation may be made in response to the output of the feedgas exhaust NOx sensor being higher than the threshold level for longer than a threshold duration, each of the threshold and threshold duration based on the total amount of unreacted reductant (e.g., SCR catalyst ammonia loading at engine shutdown), the ambient temperature, and the exhaust temperature at the engine shutdown, as described above. Thus, if there is more reductant in the exhaust passage, as sensed by the feedgas NOx sensor, and/or if the reductant in the exhaust passage continues to linger for a longer than expected duration, the controller may determine that a larger than expected ammonia deposit has formed in the exhaust passage due to reductant injector leakage.

At 320, a size of the reductant deposit is estimated based on the feedgas $NO_x$ sensor output. Since the output of the feedgas $NO_x$ sensor corresponds to an amount of reductant in the exhaust passage while $NO_x$ is not present in the exhaust passage (e.g., during engine-off conditions), the size of an exhaust passage reductant deposit may be determined based on a reductant level output by the feedgas $NO_x$ sensor during the engine-off conditions.

At 322, reductant dosing control is adjusted during the next engine-on condition based on an indication of degradation, which is described in detail with reference to FIG. 4 below. For example, in response to the indication of degradation, reductant dosing may be reduced during a subsequent engine restart from engine rest.

Thus, the feedgas $NO_x$ sensor disposed in the exhaust passage upstream of the SCR catalyst may be used to detect exhaust reductant injector degradation. Under conditions in which the engine is off and a $NO_x$ level in the exhaust passage is substantially zero, the feedgas $NO_x$ sensor may be used to measure a level of reductant (e.g., ammonia from urea deposits) in the exhaust passage. Based on the signal output by the feedgas $NO_x$ sensor, reductant injector degradation may be indicated and reductant dosing may be adjusted during subsequent engine restart from rest, as described below with reference to FIG. 4.

FIG. 4 shows a flow chart illustrating an example routine 400 for adjusting reductant dosing control during an engine restart responsive to an indication of injector leakage. Specifically, the routine adjusts an amount of reductant injected to an SCR system based on an indication of exhaust reductant injector leakage determined via the routine described above with reference to FIG. 3. For example, the reductant injector may be controlled to inject less reductant to the SCR system when reductant injector leakage is indicated.

At 402 of the routine 400, it is determined if the engine is on, such that the engine is spinning and combustion may be occurring in any or all of the cylinders of the engine. For example, it may be confirmed that the engine has been started from rest. As another example, it may be determined that the engine is on if the key is in the engine-on position or if the start button has been pressed in a keyless system. As another example, it may be determined that the engine is on if an exhaust gas flow level is above a threshold flow. If it is determined that the engine is off, the routine 400 ends.

On the other hand, if it is determined that the engine is on, the routine 400 proceeds to 404 where it is determined if a reductant injector degradation flag has been set. As an example, the reductant injector degradation flag may be set when the diagnostic code is set at 318 of routine 300. The reductant injector degradation flag provides an indication that the exhaust reductant injector is degraded, for example, and reductant dosing should be adjusted accordingly.

If it is determined that the reductant injector degradation flag has not been set, the routine moves to 420 where a reductant (e.g., urea) dosing control is adapted based on engine operating conditions. For example, the reductant may be injected to the SCR system based on a current exhaust $NO_x$ level, ambient temperature, exhaust temperature, and/or the like. In one example, the amount of reductant injected to the exhaust passage is based on an estimated exhaust $NO_x$ level relative to a target exhaust $NO_x$ level which is based on engine operating conditions.

If, on the other hand, if it is determined that the reductant injector degradation flag has been set, the routine 400 continues to 406 where reductant (e.g., urea) dosing control for reduced injection based on leak indication is adapted. For example, in order to reduce a size of reductant deposits in the exhaust passage, the amount of reductant injected to the SCR system may be reduced by an amount corresponding to the estimated size of the reductant deposit determined at 320 of routine 300. Also since a leaky injector was detected, the urea quantity demanded during regular engine operation may be adaptively reduced to account for the leaky injector. Herein, the dosing control compensates for the presence of extra reductant lingering in the exhaust passage in the form of reductant deposits. In this way, by adapting the reductant dosing control based on the indication of reductant injector leakage, the target exhaust $NO_x$ level may be maintained, for example.

At 408 it is determined if there is a drop in SCR catalyst performance. A drop in SCR catalyst performance may be indicated based on an increase in exhaust $NO_x$ levels as sensed by the tailpipe $NO_x$ sensor and/or a change in other parameters determined at 304 of routine 300.

If it is determined that there is no drop in SCR catalyst performance, the routine 400 proceeds to 410 where leak adaptation of reductant dosing control is maintained. In an alternate example, the routine proceeds to 410 if it is determined that there is an improvement in the SCR catalyst performance relative to the latched value learned earlier (specifically, at step 304 of routine 300). For example, reductant dosing continues to be modified (e.g., decreased) as described at 406 due to the indication of exhaust reductant injector leakage. Next, at 412, it is determined if the engine is off (i.e., the engine is not spinning and combustion is not occurring in any cylinders of the engine). As described above, it may be determined that the engine is off if the key is in the engine-off position or if the stop button has been pressed in a keyless system. If the engine is still on, the routine 400 returns to 410 and leak adaptation of reductant dosing control is maintained. Thus, leak adaptation of reductant dosing control is maintained while the engine is running if there continues to be no drop in SCR catalyst performance.

Turning back to 408, if it is determined that there is a drop in SCR catalyst performance, the routine moves to 422 where reductant dosing control is resumed without leak adaptation. For example, the drop in SCR catalyst performance may be due to an insufficient amount of reductant, thereby resulting in an increase of exhaust $NO_x$ detected at the tailpipe $NO_x$ sensor. As such, reductant dosing may be returned to an amount corresponding to a target exhaust $NO_x$ level without any adjustment for reductant injector leakage. Next, at 424, it is determined if the engine is off, as described above with reference to 412. If the engine is still on, the routine 400 returns to 412 and reductant dosing control without leak adaptation is maintained.

If it is determined that the engine is off (e.g., the engine is not spinning and combustion is not carried out in any cylinders of the engine) at either 412 or 424, the routine 400 moves to 414 where the reductant injection leak detection routine 300 described above with reference to FIG. 3 is performed again.

At 416, it is determined if a leak is detected. Specifically, it is determined if a leak was identified on the second iteration of the reductant injector leak detection. For example, as described above, it may be determined that the reductant injector is leaking if an actual exhaust $NO_x$ level is greater than a threshold level based on an expected exhaust $NO_x$ level during the engine shutdown conditions following 412. If a reductant injector leak was detected on a first iteration of the leak detection routine (at 300, and as indicated by the flag at 404), and if no leak is detected on the (second) iteration of the leak detection routine (performed at 414), the routine moves to 426 where the system initiates or waits for the SCR catalyst monitor. In one example, this may be an independently performed catalyst performance monitoring routine within the Aftertreatment management and OBD system. Herein, it may be determined that the injector leakage and deposit formation indicated at 404 was transient. In addition, it may be determined that the injector leakage and reductant deposit formation was possibly due to high bandwidth changes in operating conditions and/or other transient disturbance factors that may have resulted in excessive urea injection leading to deposits in the exhaust system at or around key-off On the other hand, if a leak is detected on each of the first and subsequent iteration of the injector leak diagnostic routine, the routine 400 continues to 418 where alternate leakage detection monitors are initiated, if available. The alternate leakage detection monitors may determine if reductant leakage is occurring via a method other than the method described with reference to FIG. 3. If alternate leakage detection monitors are not initiated, a leakage diagnostic code may be set. For example, in the absence of any alternate, independent injector leakage detection monitoring routines the determination of leakage made under routines 300-400 may be considered adequate to set a leakage flag.

Thus, reductant dosing control may be adjusted based on the indication of exhaust reductant injector leakage. By adjusting the amount of reductant injected to the exhaust passage to compensate for reductant injector leakage, the exhaust passage may receive an amount of reductant closer to a desired amount of desired reductant. As such, the target $NO_x$ level in the exhaust passage may be maintained and the formation of reductant deposits may be reduced.

In one example, the engine system is configured to operate in two different modes. During a first mode in which the engine is running and exhaust flow is above a threshold flow, a level of $NO_x$ in the exhaust passage (e.g., exhaust $NO_x$) may be estimated based on output of one or more of the feedgas $NO_x$ sensor and the tailpipe $NO_x$ sensor. During a second mode in which the engine is off and exhaust flow is below the threshold flow, an amount of exhaust ammonia may be estimated based on the output of the feedgas exhaust $NO_x$ sensor. Further, during the first mode, an amount of urea injected into the exhaust passage may be adjusted based on the estimated exhaust $NO_x$ level relative to a target $NO_x$ level. During the second mode, urea injector degradation may be indicated based on the estimated exhaust ammonia level relative to an expected ammonia level.

Continuing to FIG. 5, a flow chart illustrating a routine 500 for diagnosing a $NO_x$ sensor based on exhaust $NO_x$ levels after an engine shutdown to rest is shown. Specifically, the routine controls the injection of reductant into an exhaust passage once exhaust flow through the exhaust passage has stabilized after engine shutdown. Based on actual output from a feedgas exhaust $NO_x$ sensor compared to expected output from the feedgas $NO_x$ sensor, degradation of the feedgas $NO_x$ sensor may be indicated.

At 502, it is determined if the engine is off. As described above, when the engine is off, the engine is not spinning and combustion is not occurring in any cylinders of the engine. As an example, it may be determined that the engine is off if the key is in the engine-off position or if the stop button has been pressed in a keyless system. As other examples, it may be determined that the engine is off following a vehicle shutdown, after an engine shutdown to rest, and/or if an exhaust gas flow level is below a threshold flow. If it is determined that the engine is on (e.g., spinning, combusting, and not off), the routine 500 ends.

On the other hand, if it is determined that the engine is off, the routine continues to 504 where exhaust $NO_x$ sensors are kept enabled intrusively. For example, the feedgas $NO_x$ sensor and the tailpipe $NO_x$ sensor remain on and continue to output exhaust $NO_x$ levels after the engine is turned off.

At 506, it is determined if the tailpipe $NO_x$ level or tailpipe exhaust flow has stabilized. For example, the system may wait until the signal from the tailpipe $NO_x$ sensor has equilibrated or fallen below a threshold level before the routine proceeds. If it is determined that the tailpipe $NO_x$ or exhaust flow has not stabilized, the routine 500 moves to 526 where the system waits for the tailpipe $NO_x$ or exhaust flow to stabilize.

Once the tailpipe $NO_x$/flow has stabilized, or if it determined that the tailpipe $NO_x$/flow has stabilized at 506, the routine moves to 508 where reductant is injected into the exhaust passage. Specifically, because the $NO_x$ sensor may measure ammonia in the absence of $NO_x$ (e.g., during engine off conditions), reductant may be injected into the exhaust passage such that the feedgas $NO_x$ sensor may measure a corresponding amount of injected reductant and output a corresponding sensor output. Based on the output of the sensor, feedgas $NO_x$ sensor degradation may be determined. Further, an amount of reductant injected to the exhaust passage may be based on each of ambient temperature and exhaust temperature. For example, the amount of reductant injected may be increased as the ambient temperature increases and/or the exhaust temperature increases. The amount of reductant injected may be further based on a reductant load of an exhaust reduction catalyst (e.g., the SCR catalyst) at the vehicle-off condition.

In some examples, reductant may be injected as an active single injection of a predefined amount at 510 (based on the various factors described above). In other examples, the reductant may be injected via an injection pulse train with predefined characteristics at 512. As an example, the injection pulse train may have pulse train features including a magnitude and frequency designed to inject a similar total amount of reductant (e.g., urea) as for the single active injection amount adjusted as a function of exhaust temperature (at 510). The pulse train features may be further based on the response time of the feedgas exhaust NOx sensor and the exhaust temperature (at the time of the routine). For example, the frequency (or period) of the pulse may be chosen to reflect an expected 10-90% response time of a healthy NOx sensor plus the urea to ammonia evaporation time of the injected reductant at the given exhaust temperature. In still other examples, the reductant injection may be a pre-existing reductant deposit at 514. Further, in some examples, the reductant injection may be a combination of a single injection, an injection pulse train, and/or a pre-existing reductant deposit.

At 516, an expected exhaust $NO_x$ sensor output profile based on the engine exhaust conditions is determined. In one example, the expected $NO_x$ sensor output profile may be based on reductant dosing by the exhaust reductant injector prior to the engine shutdown. In another example, the expected $NO_x$ sensor output profile may be based on an amount of reductant actively injected by the exhaust reductant injector into the exhaust passage following the engine shutdown to rest (at 508). The expected NOx sensor profile may include an expected NOx sensor output over time, a peak output, an expected peak width, etc.

Once the expected exhaust $NO_x$ sensor output profile is determined, the routine 500 proceeds to 518 where the actual exhaust $NO_x$ sensor output profile based on feedgas exhaust $NO_x$ sensor output is estimated. For example, the actual exhaust $NO_x$ sensor output profile is determined based on a signal output from the feedgas exhaust $NO_x$ sensor and corresponds to a reductant level in the exhaust passage. During engine off conditions when the exhaust gas flow is substantially zero and $NO_x$ is not present in the exhaust passage, the $NO_x$ sensor may act as a reductant sensor, as the $NO_x$ sensor may be cross-sensitive to reductant injected into the exhaust passage.

At 520, feedgas exhaust $NO_x$ sensor dynamic characteristics are updated based on the estimated profile. At 522, it is determined if the actual exhaust $NO_x$ sensor output profile (determined at 518) is different than the expected exhaust $NO_x$ sensor output profile (determined at 516). In one example, it may be determined if a difference between the actual $NO_x$ sensor output profile and the expected $NO_x$ sensor output profile is higher than a threshold. If it is determined that the actual profile is substantially similar to the expected profile, the routine 500 moves to 528 where no NOx sensor degradation is indicated, and the routine ends.

On the other hand, if it is determined that the actual profile is different from the expected profile (e.g., greater than the expected profile by more than a threshold difference, or smaller than the expected profile by more than a threshold difference), the routine 500 continues to 524 where $NO_x$ sensor degradation is indicated and a diagnostic code is set. In this manner, the system may be informed that the $NO_x$ sensor is not outputting a correct indication of exhaust $NO_x$ during subsequent engine operating conditions, for example. Additionally, the learned NOx sensor output profile may be used as an input to an alternate dedicated NOx sensor diagnostics routine.

In some embodiments, based on a difference between the expected NOx sensor output and the estimated output, a nature of the degradation may also be indicated. For example, the controller may indicate that a stuck feedgas exhaust NOx sensor condition if the feedgas exhaust NOx sensor does not show any increase in output signal in response to the intrusive urea injection methods.

As another example, the dynamic response time of the feedgas exhaust NOx sensor (such as a 10-90% response or the s3% response) may be established during the rise phase of the signal. If the signal saturates during the rise phase, then the response time may be ascertained during the decay phase. Alternately the reductant injection (e.g., urea) pulse train may be used to determine the same information from the frequency response of the NOx sensor signal in response to the urea pulse.

Thus, exhaust $NO_x$ sensor degradation may be determined during engine off conditions. By injecting a known amount of reductant into the exhaust passage upstream of the SCR catalyst, an expected output of the feedgas $NO_x$ sensor may be determined. When the actual output of the feedgas $NO_x$ sensor differs from the expected output by more than a threshold amount, feedgas $NO_x$ sensor degradation is indicated, and NOx sensor characteristics may be dynamically learned and updated. In this way, reliability of a feedgas exhaust NOx sensor output can be improved.

In one example embodiment, the engine system may be operated such that exhaust reductant injector degradation and feedgas $NO_x$ sensor degradation may be indicated. For example, during a first engine shutdown to rest, the system may be operated in a first mode to indicate reductant injector degradation based on an output of the $NO_x$ sensor. During a second engine shutdown to rest, the system may be operated in a second mode to indicate feedgas $NO_x$ sensor degradation based on the output of the $NO_x$ sensor. Further, during the first engine shutdown to rest, the system may be operated to indicate reductant injector degradation based on an output of the $NO_x$ sensor responsive to the output being higher than a first threshold. The first threshold may be based on exhaust gas flow during the first engine shutdown to rest, for example. During the second engine shutdown to rest, the system may be operated to indicate feedgas $NO_x$ sensor degradation based on an output of the $NO_x$ sensor responsive to the output being lower than a second threshold. The second threshold may be based on the amount of reductant injected into the exhaust passage, for example.

FIG. 6 shows a graph illustrating an example of urea injector degradation detection. Map 600 depicts the output of a feedgas NOx sensor at curve 602 (solid line) and the output of a tailpipe NOx sensor at curve 604 (dashed line). The curve 602 shows the feedgas $NO_x$ signal continues to ramp up for a duration (e.g., approximately 20 seconds in the example of FIG. 6) after the engine is turned off, while the tailpipe $NO_x$ signal indicated by the curve 604 remains substantially zero and stable. Because the engine is off and there is no exhaust flow through the exhaust passage (e.g., $NO_x$ is not present in the exhaust passage), the indication of increased feedgas $NO_x$ may be due to a source of excess reductant detected by the feedgas $NO_x$ sensor which is positioned between the oxidation catalyst and the SCR catalyst, for example. As one example, the reductant injector may be leaking or injecting too much reductant into the exhaust passage during engine operation and the increased feedgas $NO_x$ signal may be an indication of reductant injector degradation. For example, if the reductant injector leaks, the increased feedgas $NO_x$ signal may be due to sublimation of reductant deposits resulting from excess reductant in the exhaust passage between the oxidation catalyst and the SCR catalyst. As such, the increased feedgas $NO_x$ signal after engine shutdown is indicative of reductant injector degradation.

FIG. 7 shows an example of $NO_x$ sensor degradation detection. Maps 700 and 710 depict reductant dosing at curves 702 and 706 (solid lines), and corresponding feedgas NOx sensor outputs at curves 704 and 708 (dashed lines). In the depicted example, the increased feedgas $NO_x$ signal may be due to an intentionally created reductant deposit formed from reductant injection after the engine is turned off. In such an example, feedgas $NO_x$ sensor degradation may be indicated if the feedgas $NO_x$ signal fails to correspond to an expected feedgas $NO_x$ signal corresponding to the amount of reductant injected to the exhaust passage. As described above with reference to FIG. 5, the reductant may be injected via a single injection of a predefined amount or via an injection pulse train. At map 700, curve 702 shows a single injection of reductant while curve 704 shows the corresponding feedgas $NO_x$ signal. Herein, the feedgas NOx signal corresponds to an amount less than the injected amount and $NO_x$ sensor degradation may be indicated. At map 710, curve 706 shows a reductant injection pulse train, while the curve 708 shows the corresponding feedgas $NO_x$ signal output responsive to the reductant injection pulse train. As depicted, the $NO_x$ signal corresponds to a higher level of reductant than what is injected to the exhaust passage. Thus, feed gas $NO_x$ sensor degradation may be indicated.

Thus, the feedgas $NO_x$ sensor positioned in the exhaust passage between the oxidation catalyst and the SCR catalyst may be utilized to indicate reductant injector degradation after engine shutdown (FIG. 6) or the feedgas $NO_x$ sensor may be diagnosed after engine shutdown based on reductant injection (FIG. 7).

In this way, the output of a feedgas exhaust NOx sensor can be advantageously used during engine-off conditions to estimate an amount of exhaust reductant present in the exhaust passage. Based on the estimated exhaust reductant level, each of a reductant injector and the feedgas exhaust NOx sensor can be diagnosed. By correlating the detection of elevated reductant levels by the feedgas exhaust NOx sensor during engine off conditions with reductant injector leakage, the health of the reductant injection system can be diagnosed using existing engine components. Likewise, by correlating variations between the output of the feedgas exhaust NOx sensor and a known amount of reductant injection, the health and dynamic characteristics of the exhaust NOx sensor can be reliably assessed. By using the natural sublimation of ammonia in an exhaust passage after an engine shutdown to diagnose the exhaust $NO_x$ sensor and the reductant injector, diagnostics can be completed using fewer components. Overall, exhaust emissions are improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for NOx sensor degradation detection in an engine exhaust having a reduction catalyst and a feedgas exhaust $NO_x$ sensor upstream of the reduction catalyst, comprising:
shutting down an engine to rest;
estimating an exhaust reductant level from the sensor following engine shutdown to rest; and
indicating degradation of the feedgas exhaust $NO_x$ sensor by setting a flag based on the exhaust reductant level estimated by the sensor following engine shutdown to rest.

2. The method of claim 1, wherein indicating degradation based on an exhaust reductant level estimated by the sensor includes indicating degradation in response to a difference between the estimated exhaust reductant level and an expected reductant level being higher than a threshold.

3. The method of claim 2, wherein the expected reductant level is based on reductant dosing by an exhaust reductant injector prior to the engine shutdown.

4. The method of claim 2, wherein following engine shutdown to rest includes following a vehicle shutdown, while an engine exhaust flow is below a threshold flow.

5. The method of claim 4, wherein the expected reductant level is based on an amount of reductant injected by an exhaust reductant injector into an exhaust passage following the engine shutdown to rest.

6. The method of claim 5, wherein the amount of reductant injected is based on each of ambient temperature and exhaust temperature, the amount increased as the ambient temperature increases and/or the exhaust temperature increases.

7. The method of claim 5, wherein the amount of reductant is injected as a single injection.

8. The method of claim 5, wherein the amount of reductant is injected as an injection pulse train having a magnitude and frequency based on a response time of the feedgas exhaust NOx sensor and an exhaust gas temperature.

9. The method of claim 5, wherein each of the feedgas exhaust $NO_x$ sensor and the reductant injector are coupled to the exhaust passage downstream of an oxidation catalyst and upstream of the reduction catalyst.

10. The method of claim 9, wherein the reductant is one of urea and ammonia, and wherein the reduction catalyst is an SCR catalyst.

11. The method of claim 1, wherein indicating degradation includes setting a diagnostic code.

12. A method for an engine, comprising:
following a vehicle-off condition, while an engine is at rest, injecting an amount of reductant into an exhaust passage;

estimating an amount of reductant in the exhaust passage based on an output of a feedgas exhaust $NO_x$ sensor; and indicating $NO_x$ sensor degradation based on the injected amount relative to the estimated amount.

13. The method of claim 12, wherein the vehicle-off condition includes an engine exhaust flow being below a threshold flow.

14. The method of claim 13, wherein the injected amount of reductant is based on each of ambient temperature, exhaust temperature, and a reductant load of an exhaust reduction catalyst at the vehicle-off condition.

15. The method of claim 14, wherein the injecting includes injecting the amount of reductant according to a pulse train having a magnitude and a frequency, the pulse train selected based on a response time of the NOx sensor and an evaporation time of the injected reductant.

16. The method of claim 14, wherein the injecting includes injecting the amount of reductant from a reductant injector as a single injection, the reductant including urea or ammonia, the exhaust reduction catalyst including an SCR catalyst.

17. An engine system, comprising:
an engine including an intake and an exhaust;
a reductant injector configured to inject reductant into the engine exhaust, upstream of an exhaust reduction catalyst;
a feedgas $NO_x$ sensor coupled to the engine exhaust downstream of the reductant injector and upstream of the reduction catalyst; and
a controller configured with computer readable instructions for:
during a first engine shutdown to rest, operating in a first mode to indicate reductant injector degradation based on an output of the $NO_x$ sensor; and
during a second engine shutdown to rest, operating in a second mode to indicate $NO_x$ sensor degradation based on the output of the $NO_x$ sensor.

18. The system of claim 17, wherein during the first engine shutdown to rest, indicating reductant injector degradation based on an output of the $NO_x$ sensor includes indicating degradation responsive to the output being higher than a first threshold, the first threshold based on exhaust gas flow during the first engine shutdown to rest.

19. The system of claim 18, wherein the controller includes further instructions for,
during the second mode, injecting an amount of reductant into the engine exhaust, the amount based on ambient temperature and exhaust temperature.

20. The system of claim 19, wherein during the second engine shutdown to rest, indicating $NO_x$ sensor degradation based on an output of the $NO_x$ sensor includes indicating degradation responsive to the output being lower than a second threshold, the second threshold based on the amount of reductant injected into the engine exhaust.

* * * * *